United States Patent
Höllriegl et al.

(10) Patent No.: US 11,577,444 B2
(45) Date of Patent: Feb. 14, 2023

(54) BLOW MOULDING APPARATUS WITH CLEAN ROOM AND INSPECTION OF CONTAINERS

(71) Applicant: KRONES AG, Neutraubling (DE)

(72) Inventors: Thomas Höllriegl, Teublitz (DE); Robert Schmitt, Schierling (DE); Günter Frankenberger, Koefering (DE); Andreas Eichenseher, Regensburg (DE)

(73) Assignee: KRONES AG, Neutraubling (DE)

( * ) Notice: Subject to any disclaimer, the term of this patent is extended or adjusted under 35 U.S.C. 154(b) by 165 days.

(21) Appl. No.: 16/637,037

(22) PCT Filed: Aug. 16, 2018

(86) PCT No.: PCT/EP2018/072192
§ 371 (c)(1),
(2) Date: Feb. 6, 2020

(87) PCT Pub. No.: WO2019/034727
PCT Pub. Date: Feb. 21, 2019

(65) Prior Publication Data
US 2020/0238591 A1    Jul. 30, 2020

(30) Foreign Application Priority Data
Aug. 16, 2017    (DE) ...................... 10 2017 118 656.5

(51) Int. Cl.
*B29C 49/46*    (2006.01)
*B29C 49/42*    (2006.01)
(Continued)

(52) U.S. Cl.
CPC .......... *B29C 49/46* (2013.01); *B29C 49/4205* (2013.01); *B29C 49/78* (2013.01);
(Continued)

(58) Field of Classification Search
CPC .......... B29C 49/46; B29C 2949/78512; B29C 2049/4697
See application file for complete search history.

(56) References Cited

U.S. PATENT DOCUMENTS

2019/0283305 A1*    9/2019    Hayakawa .............. B29C 49/46

FOREIGN PATENT DOCUMENTS

| CN | 102555195 A | 7/2012 |
| CN | 104944346 A | 9/2015 |
| (Continued) | | |

OTHER PUBLICATIONS

JP2000158527 translation (Year: 2000).*
(Continued)

*Primary Examiner* — Timothy Kennedy
*Assistant Examiner* — Alexander A Wang
(74) *Attorney, Agent, or Firm* — Schmeiser, Olsen & Watts, LLP

(57) ABSTRACT

Provided is an apparatus for processing containers and in particular for reshaping plastic preforms into plastic containers, including a transport device which transports the containers along a predetermined transport path, wherein this transport device has a movable support, on which a plurality of processing stations are arranged, which in each case are suitable and intended for processing the plastic preforms, with a clean room, which surrounds at least portions of the transport path of the plastic preforms and which is delimited by at least one wall relative to the environment. Further, the apparatus has at least one inspection device for inspecting the containers, wherein this inspection device has an image capturing device, wherein this image capturing device is arranged at least partially outside the clean room and monitors at least one region of the containers through at least one wall of the clean room.

15 Claims, 1 Drawing Sheet

Figure 1:
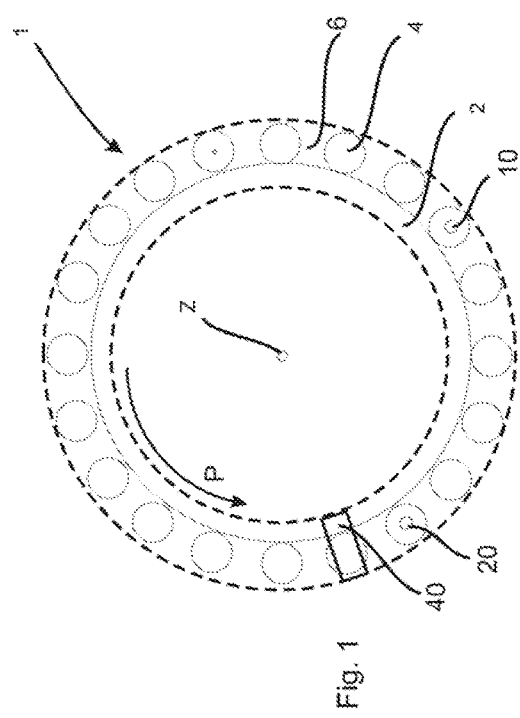

(51) Int. Cl.
 *B29C 49/78* (2006.01)
 *B29L 31/00* (2006.01)
(52) U.S. Cl.
 CPC ............ *B29C 2049/4697* (2013.01); *B29L 2031/7158* (2013.01)

(56) References Cited

FOREIGN PATENT DOCUMENTS

| | | | |
|---|---|---|---|
| DE | 69526864 | T2 | 1/2003 |
| JP | H0444902 | A | 2/1992 |
| JP | 2000158527 | A | 6/2000 |
| JP | 2014240305 | A | 12/2014 |
| WO | 2014075770 | A1 | 5/2014 |

OTHER PUBLICATIONS

Chinese Office Action dated Jun. 3, 2021 for Application No. 201880053410.9.
International Search Report dated Nov. 26, 2018 for PCT/EP2018/072192.
Thomson Scientific, London, GB;, vol. 2000, No. 39, AN 2000-446231, abstract No. 0, Retrieved from: Database WPI [online] XP002786453.

* cited by examiner

BLOW MOULDING APPARATUS WITH CLEAN ROOM AND INSPECTION OF CONTAINERS

CROSS-REFERENCE TO RELATED APPLICATIONS

This application claims priority to PCT Application No. PCT/EP2018/072192, having a filing date of Aug. 16, 2018, based on German Application No. 10 2017 118 656.5, having a filing date of Aug. 16, 2017, the entire contents both of which are hereby incorporated by reference.

FIELD OF TECHNOLOGY

The following relates to an apparatus for handling containers and in particular for reshaping plastic preforms into plastic containers. The following is described with reference to a so-called blow moulding apparatus, but it is pointed out that embodiments of the invention can also be used in the case of other equipment for processing containers, such as for example filling devices. Nevertheless, the application to blow moulding apparatus offers particular advantages, which are presented in detail in the context of the description.

BACKGROUND

Apparatus and methods for reshaping plastic preforms into plastic containers have been known for a long time from the conventional art. In this case heated plastic preforms are fed to the apparatus and are reshaped into plastic containers in a plurality of reshaping stations. In more recent time it has become known to carry out such reshaping processes in an isolator. The isolator is disinfected by sterilisation and the interior of the isolator is also described below as an aseptic room, sterile or clean room. The reshaping in the isolator offers the advantage that a sterilisation of the container which is then produced does not have to take place, but it is also already possible to sterilise the plastic preforms, which have a substantially smaller surface area.

In the production of such plastic containers and also in the following processes, faults can occur in particular due to the blow moulding process. These faults can for example cause the containers to be produced incorrectly, for example having incorrect wall thicknesses. Such containers are unsuitable for the further processing, since for example during filling with certain beverages they can burst and thus can contaminate installations. Therefore, inspection devices are known from the conventional art of the applicant. In this case this is a separate unit which is connected to the actual blow moulding module. Inspection devices are sometimes also arranged inside a clean room. In the event of maintenance or inspection of such inspection devices the problem arises that for this purpose the clean room must be opened. This consequently requires a new sterilisation of the plant and thus also leads to shutdowns of the plant, sometimes with considerable downtimes.

More precisely, during maintenance of the inspection components it is necessary to intervene in the actual sterile room, and in particular in the case of an aseptic machine this would then have to be sterilised again with substantial effort for up to several hours.

SUMMARY

An aspect relates to an apparatus with an inspection facility which, in the event of repair or maintenance of the inspection device, can be kept in continuous operation or in which at least the clean room itself does not need to be opened, or the sterile atmosphere does not need to be disturbed.

An apparatus according to embodiments of the invention for processing containers and in particular for reshaping plastic preforms into plastic containers has a transport device which transports the containers along a predetermined transport path. In this case this transport device has a movable and in particular rotatable support on which a plurality of processing stations are arranged, which are suitable and intended for processing the plastic preforms and/or plastic containers. Furthermore, the apparatus has a clean room which surrounds at least some portions of the transport path of the containers and which is separated by means of at least one wall from the environment.

According to embodiments of the invention the apparatus has at least one inspection device for inspecting the containers, wherein this inspection device has an image capturing device and this image capturing device is arranged at least partially outside the clean room and monitors at least one region of the containers through at least one wall and through a wall of the clean room. This is in particular a wall of the sterile room and a wall which delimits this sterile room.

Therefore, in contrast to the conventional art, an inspection device is proposed, which is not, as is provided in part in the internal conventional art of the applicant, arranged inside the clean room but at least partially outside it. The image capturing device, or the inspection device monitors the containers through a boundary of the clean room.

In a preferred embodiment the image capturing device has a camera, for example a CCD camera or the like, wherein this camera enables the capture of spatially resolved images.

In a further preferred embodiment, the movable support is a rotatable support. Particularly a plurality of reshaping stations, which reshape the plastic preforms into the plastic containers, are arranged on the movable support. If the apparatus according to embodiments of the invention is another apparatus such as for instance a filler or a closer, the respective processing devices can for example be filling devices or also closing elements, which close the containers with closures.

The individual processing stations particularly have stretching rods or rod-like bodies which can be introduced into the plastic preforms in order to expand them in their longitudinal direction.

In a further advantageous embodiment, the individual reshaping stations have blow moulds inside which the plastic preforms can be expanded into the plastic preforms. In this case these blow moulds are formed in multiple parts and each have two side parts and a base part. In this case the side parts are arranged on side part supports which are pivotable relative to one another in order to open and to close the blow moulds.

In this case during the production plastic preforms are introduced into the blow moulds and are expanded inside these blow moulds. Then the plastic containers produced by expansion are removed from the blow moulds again. The at least one inspection device is arranged in a region of the apparatus in which after the expansion of the plastic preforms the blow moulds are again in an at least partially opened state.

In addition, the reshaping stations can also have application devices, such as for example blow moulding dies, which apply a liquid or gaseous medium, a gaseous medium, to the plastic preforms.

Furthermore, the individual reshaping stations can also have rod-like bodies which can be introduced into the plastic preforms in order to expand these containers in their longitudinal direction.

The clean room is advantageously formed in an annular or toroidal manner around the reshaping stations and/or the transport path of the plastic containers. In a further preferred embodiment, the transport device allows separate transport of the individual plastic preforms.

Therefore, in contrast to the conventional art it is proposed that the monitoring of the containers or the inspection thereof takes place through the clean room boundary. For this purpose, the clean room boundary can be formed for example at least in portions by a window or another transparent element through which a camera can monitor the containers. In this case this transparent element can extend in a circumferential direction around an axis of rotation, around which a support rotates on which the individual reshaping devices are arranged.

In this case this transparent element can be configured as a window through which the containers can be monitored. In a preferred embodiment this transparent element or window can be temperature-controlled and in particular can be heated. In this way this window can be kept clear for example when condensation occurs. In a further preferred embodiment, a window can also be provided in the region of the apparatus through which the containers are illuminated (from the exterior).

Furthermore, it is also possible that these transparent regions can be cleaned, and the apparatus has a cleaning device which serves for automatic cleaning of at least those regions or windows through which the containers are monitored, for example by means of wipers or blowing off with a sterile medium. In a further preferred embodiment, it is also possible that these windows or viewing areas are anti-reflective, in order to prevent distortions in the image capture.

Protective glasses are installed in a non-planar manner, that is to say obliquely with respect to the image recording device in order on the one hand to deflect disruptive reflections from the image capturing device and on the other hand to take structural precautions to allow any spray water to flow off. These window regions move relative to the image capturing device into a protected region in which it/they can be removed, cleaned and sterilised. Particularly an air curtain is located in the sterile room in front of the protective glass in order to deflect any spray water. However, it would also be conceivable that the window regions are arranged in a stationary manner and are automatically covered in the case of cleaning of the aseptic region by means of a sealed protection.

It is therefore proposed that the inspection device is divided into assemblies, which are particularly installed in the aseptic room from the exterior, and also into main components, which can be accessed and disassembled from the exterior, so that maintenance works are carried out without having to open the clean room for this purpose. Thus, for example the image capturing device, for example the camera, is accessible, without the clean room having to be opened or the sterility of the clean room having to be interrupted.

It is possible that, even in the event of maintenance or repair of the inspection device, no opening of the clean room is necessary.

The decoupling of the clean room from inspection units in the cleaning process of the aseptic region is particularly advantageous. As a function of the system the cleaning process operated at temperatures of up to 60° and more is effectively decoupled by the structural separation of the camera unit or lamp unit from the sterile room boundary, or a potentially necessary cooling of the electronic system can be simply implemented from the "non-sterile side".

In a further advantageous embodiment, the inspection device has an illumination device which is suitable and intended for illuminating at least a portion of the containers. In this case this is advantageously a portion which is also illuminated by the image capturing device. In this case it is possible that the illumination device is mechanically coupled to the image capturing device, for example by means of a linkage. In this way a predetermined distance between the image capturing device and the illumination device can be preset.

The image capturing device is particularly suitable and intended in particular for monitoring a base region of the finished containers. In this case monitoring of these base regions can take place both in the reflected light method and also in the transmitted light method. In particular, the monitoring of the containers or the bases takes place by a transmitted light method. Thus, it is possible that the bases are illuminated from below and subsequently are monitored by means of a camera. In this case monitoring of the bases can take place for example through a mouth of the containers.

In a further advantageous embodiment, the illumination device illuminates the containers likewise through at least one wall of the clean room. For this purpose, this wall or a region of this wall can also be made transparent. Thus, it is proposed here that the illumination device is also arranged at least in part outside the clean room or outside the clean room boundary.

In a further advantageous embodiment, the illumination device is arranged in such a way that the containers are transported between the illumination device and the image capturing device. Thus, it is possible, for example, that the illumination device monitors the container bases from below and the bases which are illuminated in this way are monitored or captured from above by the image capturing device.

In this case it is additionally possible that the illumination device can be pulled downwards or in one direction. It is also possible that the image capturing device can be pulled upwards or also in a predetermined direction.

In a further preferred embodiment, the illumination device has a lens element and, in particular but not exclusively, a so-called Fresnel lens. In particular in the case of the construction described here, a Fresnel lens is particularly suitable in order to generate correspondingly directed light which serves for illumination.

In a further advantageous embodiment, the image capturing device is arranged in such a way that it monitors the containers along the longitudinal direction. This is particularly advantageous, in particular for monitoring the bases of the containers.

In a further advantageous embodiment, the apparatus has an application device which applies a gaseous medium to the clean room. In this case this application device is configured in such a way that it puts the clean room under a positive pressure relative to an (unsterile) environment. In particular, such a positive pressure can ensure that no foreign bodies enter the clean room from the exterior. In this case, for example, inlets into the clean room can be provided for a sterile gas. Outlets can also be provided in order to allow a gas to escape from the sterile room or clean room in a defined manner. However, the sterile room or clean room is configured in such a way that it is delimited by means of one wall and a plurality of walls relative to the environment.

In a further advantageous embodiment, the inspection device and/or the image capturing device is/are movable relative to the clean room. In this case a movability may also be provided in particular in a longitudinal direction of the containers to be monitored. This movability in particular makes maintenance of the image capturing device and/or the illumination device easier.

Furthermore, embodiments of the present invention are directed to a method for processing containers and in particular for reshaping plastic preforms into plastic containers. In this case the plastic preforms and/or plastic containers are transported by means of a transport device along a predetermined transport path, wherein this transport device has a movable support on which a plurality of processing stations are arranged, which process the plastic preforms and/or plastic containers while they are being transported. Furthermore, the plastic preforms and/or plastic containers are transported through a clean room which surrounds at least portions of a transport path of the plastic containers or the plastic preforms and/or of reshaping stations which serve for reshaping the plastic preforms, this clean room being delimited by means of at least one wall relative to the environment.

According to embodiments of the invention the plastic containers are inspected by an inspection device, wherein this inspection device has an image capturing device and wherein this image capturing device is arranged at least partially outside the clean room and monitors at least one region of the containers through at least one wall of the clean room. In this way, in terms of the method, monitoring of the containers takes place through the clean room boundary of the clean room.

In this case an illumination of the containers advantageously takes place while they are being transported. The containers are illuminated by an illumination device and in particular are also illuminated through a sterile room boundary or clean room boundary of the clean room. In a further preferred method, the containers are illuminated by pulsed light or flashing light.

In a further preferred method, the plastic containers are inspected after they have been reshaped. This means that first of all the plastic preforms are reshaped and in particular expanded into plastic containers and then the containers produced in this way are inspected at the reshaping station or on the following transport path.

In this case it would be possible that the inspection device is arranged stationary relative to the transport path or to the transport movement of the plastic containers. However, it would also be possible that one or more inspection devices are provided which move with the containers.

BRIEF DESCRIPTION

Figure 2:
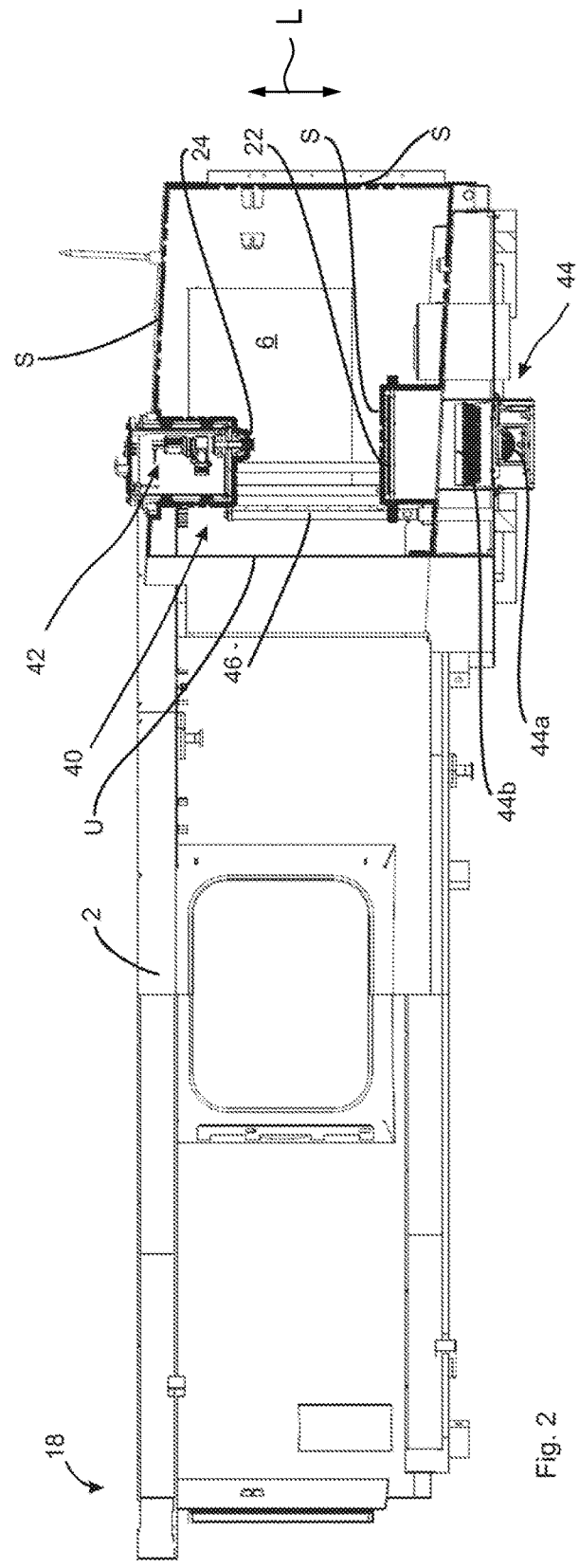

Some of the embodiments will be described in detail, with reference to the following figures, wherein like designations denote like members, wherein:

FIG. 1 shows a rough schematic representation of an apparatus according to embodiments of the invention; and FIG. 2 shows a representation of an apparatus according to embodiments of the invention.

DETAILED DESCRIPTION

FIG. 1 shows a schematic representation of an apparatus 1 according to embodiments of the invention. This apparatus 1 has a rotatable support 2 which is rotatable about an axis of rotation Z and in the direction of the arrow P and on which a plurality of reshaping stations 4 are arranged. As stated above, these reshaping stations serve to reshape plastic preforms 10 into plastic containers 20.

The reference 6 designates a clean room, which toroidally surrounds at least the transport path of the reshaping station 4 and thus also of the plastic preforms. The reference 40 designates the inspection device, which serves for inspecting the shaped containers 20 (which may in particular be plastic bottles). In this case this inspection device is arranged outside the clean room. The clean room is delimited by the two broken lines. Nevertheless, air locks (not shown) can be provided, through which the plastic preforms can be introduced into the clean room and/or through which the blow moulded plastic containers can be removed from the clean room.

FIG. 2 shows a more detailed representation of the apparatus according to embodiments of the invention. The reference 6 again designates the clean room which is located inside the clean room boundary S. The reshaping stations (not shown in FIG. 2) are located inside this clean room.

The inspection device designated overall by 40 has a monitoring device or image capturing device 42, which monitors the containers through a window 24 which is only illustrated schematically. In this case this monitoring device is oriented in the longitudinal direction L of the reshaping stations (and also of the expanded containers) or in a vertical direction and monitors the containers in particular in this direction.

This window can be configured in an annular manner and likewise can rotate about the axis of rotation Z. However, it would also be conceivable that this window is arranged stationary on the apparatus. Thus, this window 24 is also the wall region through which the image capturing device monitors the containers located in the interior of the clean room.

Thus, the image capturing device 42 is arranged outside the clean room 6, as shown in FIG. 2. More precisely, this image capturing device here is arranged above the clean room. The reference 44 designates an illumination device, which is likewise a component of the inspection device designated overall by 40. This illumination device 44 here is likewise arranged outside the clean room 6, but in this case in particular it is arranged below the clean room 6. Thus, the containers here are transported between the image capturing device 42 and the illumination device 44.

The illumination device 44 can have a light source 44a. In this case for example this light source can have a plurality of LEDs which generate the light which serves for inspection. The reference 44b shows scattering elements and/or lens elements such as for instance a so-called Fresnel lens. These is also arranged in particular outside the clean room.

The reference 22 designates a further window portion, through which the illumination of the containers takes place.

The reference 46 relates to a mechanical connection between the image capturing device and the illumination device, such as in particular but not exclusively a linkage. In this way a predetermined distance between the image capturing device and the illumination device can be fixed, although a change to this distance is possible.

Sealing means such as for instance the sealing means 18 can be provided for delimitation of the clean room. In this case these sealing means can be configured as a water lock.

The applicant reserves the right to claim all the features disclosed in the application documents as essential to embodiments of the invention in so far as they are individually or in combination novel over the conventional art. Furthermore, it is pointed out that in the individual drawings, features were also described which may be advantageous per se. The person skilled in the art recognises immediately that a specific feature described in a drawing may also be advantageous without the incorporation of further features from this drawing. Furthermore, the person skilled in the art recognises that advantages may also result from a combination of several features shown in individual drawings or in different drawings.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCES 1 apparatus
2 support
4 processing station
6 clean room
10 plastic preforms
18 sealing means
20 plastic containers
22 transparent wall, window
24 transparent wall, window
40 inspection device
42 image capturing device
44 illumination device
44a light source
44b scattering and/or lens elements
46 mechanical connection
Z axis of rotation
U transition movable/immovable region
S sterile room boundary
L longitudinal direction

The invention claimed is:

1. An apparatus for processing containers with a transport device which transports the containers along a predetermined transport path, wherein this transport device has a movable support, on which a plurality of processing stations are arranged, which in each case are suitable and intended for processing the plastic preforms, with a clean room, which surrounds at least portions of the transport path of the plastic preforms and which is delimited by means of at least one wall relative to the environment, wherein the apparatus has at least one inspection device for inspecting the containers, wherein the at least one inspection device has an image capturing device, wherein the image capturing device is arranged at least partially outside the clean room and monitors at least one region of the containers through at least one wall, wherein the at least one inspection device has an illumination device which illuminates at least a portion of the containers, wherein the illumination device is arranged in such a way that the containers are transported between the image capturing device and the illumination device.

2. The apparatus according to claim 1, wherein the illumination device illuminates the containers through at least one wall of the clean room.

3. The apparatus according to claim 1, wherein the image capturing device is arranged in such a way that it monitors the containers along their longitudinal direction.

4. The apparatus according to claim 1, wherein the apparatus has an application device which puts the clean room under an overpressure at least for a while.

5. The apparatus according to claim 1, wherein at least one of the inspection device and the image capturing device is or are movable relative to at least one of the clean room and at least one wall delimiting the clean room.

6. The apparatus according to claim 1, wherein the apparatus is an apparatus for reshaping plastic preforms into plastic containers.

7. The apparatus according to claim 1, wherein the illumination device is arranged in a way that a base is illuminated from below and subsequently monitored by means of a camera.

8. The apparatus according to claim 1, wherein the illumination device is arranged in a way such that it illuminates the containers through at least one wall of the clean room, wherein the illumination device is also arranged at least in part outside the clean room or outside the clean room boundary.

9. The apparatus according to claim 1, wherein the inspection device and/or the image capturing device is/are movable relative to the clean room, wherein a movability may also be provided in a longitudinal direction of the containers to be monitored.

10. The apparatus according to claim 1, wherein the apparatus has a cleaning device which serves for automatic cleaning of at least a region or window through which the containers are monitored.

11. The apparatus according to claim 1, wherein the apparatus has protective glasses installed obliquely with respect to the image recording device in order on the one hand to deflect disruptive reflections from the image capturing device and on the other hand to take structural precautions to allow any spray water to flow off.

12. A method for processing containers for reshaping plastic preforms into plastic containers, wherein at least one of the plastic preforms and plastic containers are transported by means of a transport device along a predetermined transport path, wherein this transport device has a movable support on which a plurality of processing stations are arranged, which process the at least one of the plastic preforms and plastic containers while they are being transported, and wherein the at least one of the plastic preforms and plastic containers are transported through a clean room which surrounds at least portions of the transport path thereof which is delimited by at least one wall relative to the environment, wherein the plastic containers are inspected by means of an inspection device, wherein the at least one inspection device has an image capturing device, wherein the image capturing device is arranged at least partially outside the clean room and monitors at least one region of the containers through at least one wall of the clean room, wherein the at least one inspection device has an illumination device which illuminates at least a portion of the containers, wherein the illumination device is arranged in such a way that the containers are transported between the image capturing device and the illumination device.

13. The method according to claim 12, wherein the plastic containers are inspected after they have been reshaped.

14. The method according to claim 12, wherein the containers are illuminated through a further wall of the clean room.

15. An apparatus for processing containers with a transport device which transports the containers along a predetermined transport path, wherein the transport device has a movable support, on which a plurality of processing stations are arranged, which in each case are suitable and intended for processing the plastic preforms, with a clean room, which surrounds at least portions of the transport path of the plastic preforms and which is delimited by means of at least one wall relative to the environment, wherein the apparatus has at least one inspection device for inspecting the containers, wherein the at least one inspection device has an image capturing device, wherein the image capturing device is arranged at least partially outside the clean room and monitors at least one region of the containers through at least one wall, wherein the image capturing device is configured for monitoring a base region of the finished containers, wherein the at least one inspection device has an illumination device which illuminates at least a portion of the containers, wherein the illumination device is arranged in such a way that the containers are transported between the image capturing device and the illumination device, wherein the illumination device illuminates the containers through at least one wall of the clean room.

* * * * *